3,274,280
PREPARATION OF ALPHA-OLEFINS

David W. Marshall and Wayne R. Sorenson, Ponca City, Okla., assignors to Continental Oil Company, Ponca City, Okla., a corporation of Oklahoma
No Drawing. Filed Nov. 23, 1962, Ser. No. 239,771
17 Claims. (Cl. 260—677)

This invention relates to a method for the preparation of alpha-olefins. In one aspect, it relates to the preparation of alpha-olefins utilizing oxygen containing metal hydrocarbon compounds whereby undesirable reactions and reaction products are substantially reduced.

It is an object of this invention to provide an improved process for the preparation of alpha-olefins.

It is another object of this invention to provide an improved process for the preparation of odd numbered alpha-olefins.

Still another object of this invention is to provide an improved method for the preparation of alpha-olefins without the use of complexing agents.

Another object of this invention is to provide an improved process for the preparation of alpha-olefins from metal hydrocarbon compounds.

Yet another object of this invention is to provide an improved process for the preparation of alpha-olefins from alkoxy-metal hydrocarbon compounds.

The foregoing objects are realized broadly by reacting an allylic halide with a metal hydrocarbon compound or a hydrocarbonoxy metal hydrocarbon compound and recovering a product comprising alpha-olefin.

In one aspect of the invention, the allylic halide is reacted with a metal hydrocarbon compound in the presence of a complexing agent which complexes with metal halide formed in the reaction.

The metal hydrocarbon compounds which are employed in the process of this invention are designated by the formula $MR_x$ wherein M is a metal selected from the group consisting of aluminum, antimony, bismuth, cadmium, copper, gallium, germanium, indium, lead, mercury, thallium, tin and zinc; R is a hydrocarbon radical which is capable of joining a carbon atom selected from the group consisting of alkyl, cycloalkyl, aryl, alkaryl and aralkyl; and $x$ is the valence of M. The hydrocarbon portion of the metal hydrocarbon compound can vary broadly in molecular weight, however, usually these compounds have a carbon content not greater than about 30.

The allylic halides, as the term is employed herein, are the hydrocarbon halides which contain olefinic unsaturation and are mono-halogenated in the three position relative to the double bond. Preferably, these compounds are represented by the formula:

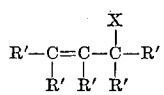

wherein each R′ is individually selected from the group consisting of hydrogen and alkyl, cycloalkyl, aryl, alkaryl and aralkyl hydrocarbon radicals, and X is a halogen. Here again the carbon content of the allylic halide is not limited, however, preferably these compounds do not contain more than about 30 carbon atoms.

The preferred metal hydrocarbon compounds are the aluminum trialkyls, particularly the lower trialkyls and the preferred allylic halides are the 3-halo-1-alkenes.

Specific reaction systems which are employed in carrying out the method of this invention include the following:

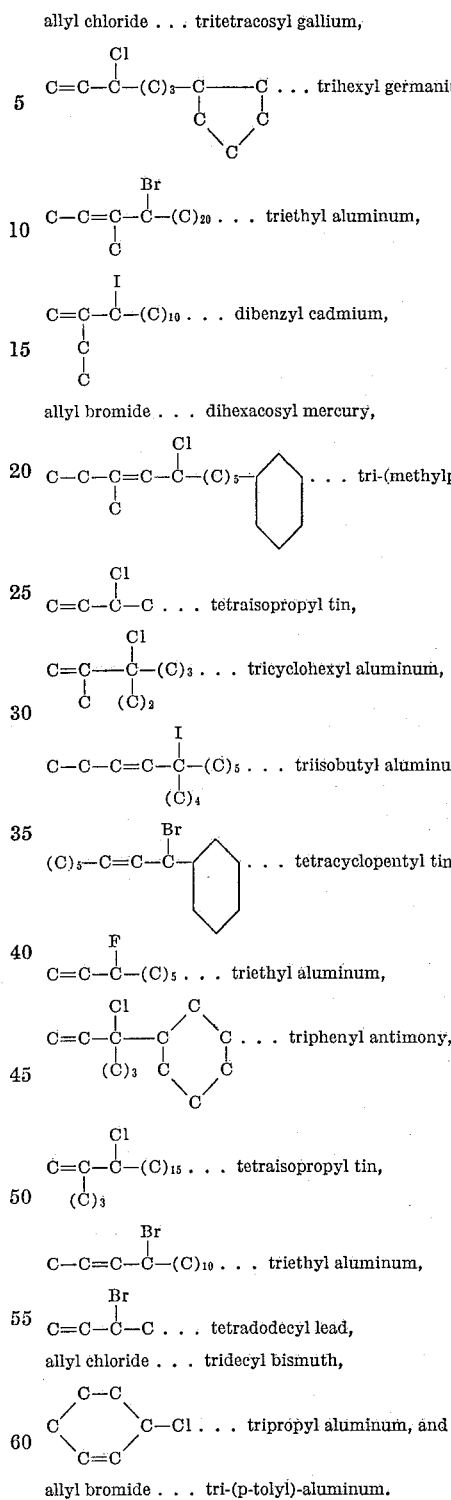

There is no limitation on the molecular weight of the olefins which can be prepared by the method of this invention, however, the reactivity of the allylic halide and the metal hydrocarbon compound decreases with increasing carbon chain length. In view of this, it is usually preferred to select the reactants in such a manner the alpha-olefin product does not contain more than about 30 carbon atoms.

In carrying out the process, it is desirable to add the allylic halide to the metal hydrocarbon compound since the reaction in the presence of excess allylic halide can produce the metal halide, which in turn produces undesirable side reactions with the metal hydrocarbon compound and with the olefin product, for example, isomerization or polymerization of the olefin. It is also desirable to prevent localized concentrations of the allylic halide in the reaction system preferably by providing agitation of the reactants during the addition of the allylic halide. Since the reaction of the allylic halide with the metal hydrocarbon compound is exothermic, the reaction is preferably carried out in the presence of an inert diluent which serves to dilute the reactants and make possible closer control of the reaction temperature. The diluents employed include paraffinic compounds such as hexane, heptane, decane, dodecane, cyclohexane, methyl cyclopentane, cyclohexane, and the like. In addition, mixtures of paraffins or hydrocarbon fractions of a paraffinic nature can also be employed. The inert diluent can also be a halogenated hydrocarbon which is inert in the reaction system.

The reaction is carried out over a wide range of temperatures depending on the particular reactants employed, the temperature increasing generally with the molecular weight of the reactants. Ordinarily, the reaction is carried out in a temperature range of about 25 to about 350° C. and preferably about 25 to about 100° C. The reaction pressure can be sub-atmospheric, atmospheric, or superatmospheric and is held at a suitable level to maintain the reactants and inert diluent in the liquid state. Usually, the reaction is carried out at substantially atmospheric pressure.

As pointed out previously, the reaction of the allylic halide and hydrocarbon compound can produce metal halide which promotes undesirable side reactions. In order to limit these reactions, it is desirable that the amount of allylic halide preferably be not greater than stoichiometric and also that the reaction be carried out with rapid removal of the olefin from the reaction product, e.g., by distillation. By using a stoichiometric amount of allylic halide, it is possible to provide maximum reaction of the metal hydrocarbon compound with the greatest yield of olefin product. It is, however, within the scope of the invention to employ lesser amounts of allylic halide whereby only a part of the hydrocarbon group are removed from the metal hydrocarbon compound. Thus, in the reaction of allyl chloride with triethyl aluminum, one mole of the halide will react to provide as product one mole of olefin and one mole of diethyl aluminum chloride. With two moles of the halide, the aluminum alkyl is converted to ethyl aluminum dichloride. It is also within the scope of the invention to carry out the reaction in a series of steps or stages in which olefin product is recovered from the reaction system after each reaction step.

The reaction product can be processed in any suitable manner to recover the alpha-olefins. If the product contains hydrocarbon aluminum halides, these can be separated by distillation or can be hydrolyzed with a conventional hydrolyzing agent, for example, water or an acid and the olefins then separated from the hydrolyzed product, for example, by decantation.

Removal of all of the hydrocarbon radicals from the metal hydrocarbon compound by reaction with the allylic halide provides a maximum yield of olefins but also results in the formation of metal halide which, as pointed out previously, can have an adverse effect, particularly on the olefin product. In one aspect of this invention, the reaction of the allylic halide with the metal hydrocarbon compound is carried out in the presence of an agent which complexes with metal halide formed in the reaction. It has been found that the undesired reactions which result from the formation of the metal halide can be substantially eliminated by the formation of a complex between the metal halide and the complexing agent. Among the complexing agents which can be employed are the hydrocarbon amines, i.e., both aliphatic and aromatic amines. These include the tertiary alkyl amines such as trimethyl amine, the azines such as pyridine, and the alkyl and halo derivatives of the azines, such as methyl pyridine, chloropyridine, and the like. A detailed discussion of these complexing agents and the use thereof can be found in U.S. Patent No. 2,935,536.

When a complexing agent is employed, the reaction product can be hydrolyzed and the olefin recovered from the organic layer which results.

Another embodiment of the invention comprises reaction of an allylic halide with an organometal compound, viz., a hydrocarbonoxy metal hydrocarbon compound, in which a portion of the valence of the metal is connected through oxygen to a hydrocarbon radical. The hydrocarbonoxy radical is not readily reacted with the allylic halide and as a result there is no formation of metal halide even when stoichiometric or greater than stoichiometric amounts of allylic halide are employed. While this embodiment does not provide as great an olefin yield as can be obtained through the use of the metal hydrocarbon compound, it does obviate the problem of side reactions and eliminates the use of a complexing agent.

The organometal compounds which are employed in this embodiment of the invention include broadly those represented by the formula:

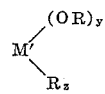

in which M' is a metal selected from the group consisting of aluminum, antimony, bismuth, cadmium, copper, gallium, germanium, indium, lead, mercury, thallium, tin and zinc; R is a hydrocarbon radical capable of joining to a metal atom through a carbon atom, selected from the group consisting of alkyl, aryl, aralkyl, cycloalkyl, and alkaryl; $y+z$ equal the valence of M' and $y$ is at least about 1.0. The preferred organometal compounds are the hydrocarbonoxyaluminum hydrocarbon compounds and more specifically the alkoxyaluminum alkyls, such as ethoxydiethylaluminum.

Specific illustrative reaction systems which can be employed in carrying out this embodiment of the invention are the reaction of:

n-octoxydi-n-octylaluminum . . . allyl chloride di-n-octoxy-n-octylaluminum . . . C=C—C(Br)—[phenyl]

isobutoxytri-isobutyltin . . . $(C)_2$—C=C—C(I)—$(C)_5$ with $(C)_4$ n-hexoxydi-n-hexylaluminum . . . C=C—C(I)—$(C)_{10}$ n-hexoxydi-n-hexylaluminum . . . C—C=C—C(Br)—C with C di-n-heptoxy-n-heptylaluminum . . . allyl bromide n-decoxy-di-n-decylaluminum . . . C=C—C(F)—$(C)_5$ with $(C)_2$ n-dodecoxydi-n-dodecylaluminum . . . C=C—C(Cl)—$(C)_{15}$
n-butoxydi-n-butylantimony . . . allyl chloride
di-n-hexacosoxy-n-hexacosylaluminum . . . allyl bromide

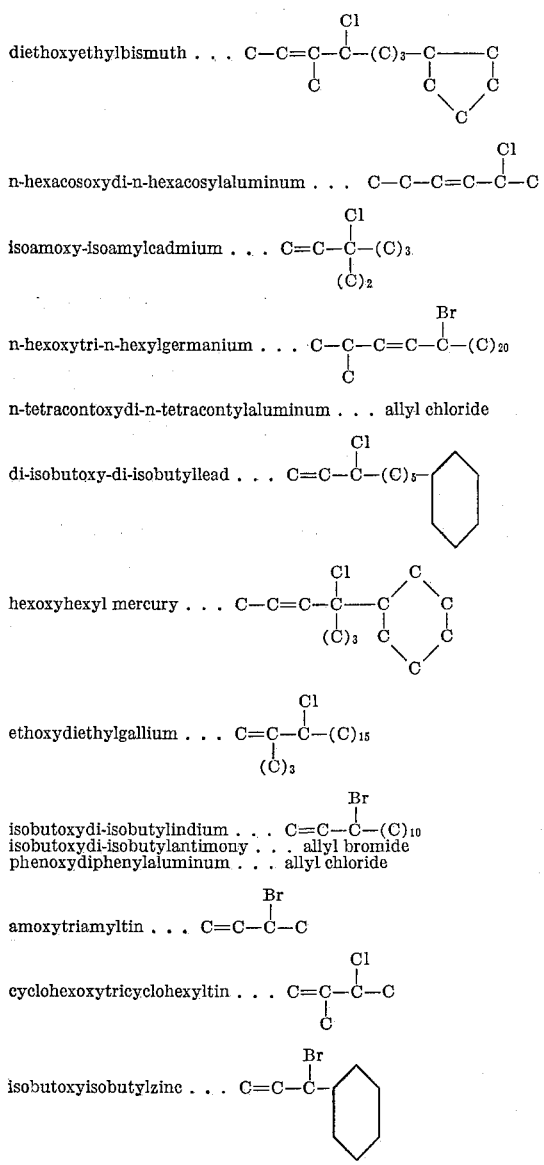

diethoxyethylbismuth . . .

n-hexacosoxydi-n-hexacosylaluminum . . .

isoamoxy-isoamylcadmium . . .

n-hexoxytri-n-hexylgermanium . . .

n-tetracontoxydi-n-tetracontylaluminum . . . allyl chloride di-isobutoxy-di-isobutyllead . . .

hexoxyhexyl mercury . . .

ethoxydiethylgallium . . .

isobutoxydi-isobutylindium . . .
isobutoxydi-isobutylantimony . . . allyl bromide
phenoxydiphenylaluminum . . . allyl chloride amoxytriamyltin . . .

cyclohexoxytricyclohexyltin . . .

isobutoxyisobutylzinc . . .

As noted above, the hydrocarbonoxy group is attached to at least one valence bond of the metal. The quantity of alpha-olefin produced per mole of organometal compound is dependent, of course, on the value of $y$, and it is preferred that $y$ be not greater than about 1.0, however $y$ can vary up to as high as about 90 percent of the total valency of the metal.

The operating conditions employed in the aforedescribed embodiment of the invention correspond to those previously set forth in the description relating to the hydrocarbon metal compound. Thus, the present embodiment utilizes preferably an inert diluent and is carried out under conditions of temperature and pressure corresponding to those previously set forth. Since the metal halide is not formed in the reaction, the amount of reactants can vary more widely, however, again preferably the amount of allylic halide used is the stoichiometric requirement to effect complete reaction with the hydrocarbon radicals of the hydrocarbonoxy metal hydrocarbon compound.

It is within the scope of the invention to employ either individual organometal compounds or mixtures of such compounds. Thus, the invention in one aspect employs complex mixtures of aluminum compounds which are obtained in the aluminum alkyl growth process. In this process, an aluminum alkyl such as triethylaluminum is reacted with low molecular weight olefins such as ethylene to form a "growth" product, said product comprising trialkylaluminum compounds in which the alkyl groups vary widely in molecular weight. The growth reaction can be illustrated by an equation as follows:

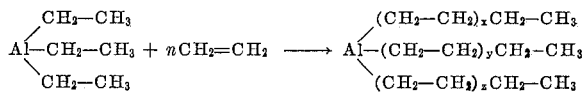

wherein $x$, $y$ and $z$ represent integers ranging from 0 to about 14 and $x+y+z=n$. The growth reaction is carried out by passing ethylene through triethylaluminum, preferably in the presence of a diluent under a wide variety of reaction conditions, for example, 65 to 150° C. and 200 to 5,000 p.s.i.g., preferably 90 to 120° C. and 1,000 to 3,500 p.s.i.g. Although triethylaluminum is the preferred reactant, other low molecular weight aluminum alkyls, such as tripropylaluminum, tributylaluminum, triisobutylaluminum, diethylaluminum hydride, ethylaluminum dihydride, diethylaluminum chloride, ethylaluminum dibromide, dipropylaluminum chloride, etc., can be employed and other low molecular weight aliphatic alpha-olefins, such as propylene, butene, and the like can be substituted in lieu of ethylene.

It has been found that the growth reaction provides a statistical distribution of alkyl chain lengths characterized by the Poisson relationship, which can be expressed as follows:

$$P_{(n)} = \frac{m^n e^{-m}}{n!}$$

wherein $P_{(n)}$ represents the probability that a certain hydrocarbon radical will be formed by $n$ additions of ethylene to the aluminum-ethyl bond originally present and $m$ is the mean number of additions of ethylene per growing chain. An example of the type of distribution which is obtained in the growth reaction is presented in the following table.

TABLE

| Alkyl group: | Weight percent |
|---|---|
| $C_2$ | 0.04 |
| $C_4$ | 0.25 |
| $C_6$ | 3.37 |
| $C_8$ | 11.79 |
| $C_{10}$ | 20.42 |
| $C_{12}$ | 22.63 |
| $C_{14}$ | 18.20 |
| $C_{16}$ | 11.61 |
| $C_{18}$ | 6.21 |
| $C_{20}$ | 3.47 |
| $C_{22}$ | 1.25 |
| $C_{24}$ | 0.49 |
| $C_{26}$ | 0.18 |
| $C_{28}$ | 0.05 |

The growth product is reacted with oxygen (air) usually at a temperature from about 20 to about 100° C., and a pressure from about 10 to 60 p.s.i.g. whereby alkyl groups are converted to alkoxides. The degree of oxidation, that is, the percentage of alkyl groups which are oxidized, can be readily controlled by the use of appropriate temperatures, pressures, and reaction time. The aluminum trialkyls or the alkoxyaluminum alkyls which result from the oxidation process or any portion or fractions thereof can be employed as reactants in the process of this invention.

The following examples are presented in specific illustration of the invention.

Example I

A clean, dry, 300 ml. Magnestir autoclave was flushed with dry $N_2$ then placed in the dry-box. 0.1 mole aluminum triethyl in 100 ml. $CaH_2$ dried n-decane was charged, followed by 0.1 mole distilled allyl chloride in 100 ml. $CaH_2$ dried n-decane. The head was secured and the reaction mixture brought to 100° C. for 3 hours. The autoclave was vented through a cold trap using iprOH Dry Ice as the bath. No liquid was trapped. The autoclave was opened with an aliquot being hydrolyzed using dilute HCl. The hydrocarbon layer from hydrolysis was dried, then analyzed. Results showed pentene-1 to be present. Aluminum and chlorine analyses showed Al/Cl ratio of 1/1.12, indicating a close check to AlEt$_2$Cl. Hydrolysis of the reaction mixture gave 72 percent ethyl groups as ethane vs. theoretical 66 percent.

*Example II*

A dry 250 ml. pop bottle was flushed with argon and 78.2 ml. distilled CaH$_2$ dried n-heptane added. The bottle was then corked and placed in the dry-box, where 0.05 mole Al(C$_6$H$_{11}$)$_3$ and 0.05 mole distilled CaH$_2$ dried allyl chloride were measured and added by means of hypodermic syringes. The bottle was removed from the dry-box, capped, then placed in the bottle polymerizer 3 hours at 75° C. The bottle was removed, cooled, and an aliquot hydrolyzed to give a dry hydrocarbon layer for GLPC analysis. Analysis of the layer indicated nonene-1 was produced in 52 percent of theory. Recovery of alkyl groups was 90 percent. Al/Cl ratio in the reaction mixture was 1.3/1, indicating a close approximation of AlEt$_2$Cl The olefins prepared in accordance with this process can be used in any conventional applications such as, for example, as intermediates in the production of alcohols and in the preparation of aldehydes and acids.

Having thus described the invention by providing specific examples thereof, it is to be understood that no undue limitation or restrictions are to be drawn by reason thereof and that any variations and modifications are within the scope of the invention.

We claim:

1. A process for preparing alpha-olefins which consists essentially of reacting an allylic halide with an organometal compound selected from the group consisting of AlR$_3$ and (RO)$_y$—Al—R$_z$, wherein R is a hydrocarbon radical selected from the group consisting of alkyl, aryl, aralkyl, cycloalkyl and alkaryl; $y+z$ equals three, and $y$ is at least about 1.0; and recovering a reaction product comprising alpha-olefin.

2. A process for preparing alpha-olefins which consists essentially of reacting an allylic halide having the formula:

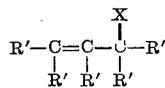

wherein each R' is individually selected from the group consisting of hydrogen and alkyl, cycloalkyl, aryl, alkaryl and aralkyl hydrocarbon radicals, and X is a halogen with an organometal compound selected from the group consisting of AlR$_3$ and (RO)$_y$—Al—R$_z$, wherein R is a hydrocarbon radical selected from the group consisting of alkyl, aryl, aralkyl, cycloalkyl, and alkaryl; $y+z$ equals three, and $y$ is at least about 1.0; and recovering reaction product comprising alpha-olefin.

3. The process of claim 2 in which the reaction is carried out at a temperature of about 25 to about 350° C.

4. The process of claim 3 in which the reaction is carried out in an inert liquid diluent.

5. The process of claim 4 in which the allylic halide is allyl chloride.

6. A process which consists essentially of reacting a 3-halo-1-alkene with an aluminum trialkyl in the presence of a diluent at a temperature between about 25 and about 350° C. and recovering reaction product comprising alpha-olefin.

7. The process of claim 6 in which said 3-halo-1-alkene is allyl chloride.

8. The process of claim 7 in which the aluminum trialkyl is aluminum triethyl.

9. The process of claim 7 in which the aluminum trialkyl is aluminum trihexyl.

10. A process for preparing alpha-olefins which consists essentially of adding an allylic halide to aluminum trialkyl in an amount not greater than 3 moles of allylic halide per mole of aluminum trialkyl with agitation under reaction conditions of temperature and pressure and recovering a product comprising alpha-olefin.

11. The process of claim 10 in which the reaction is carried out in the presence of a diluent and at a temperature of about 25 to about 350° C.

12. The process of claim 11 in which the allylic halide is allyl chloride.

13. The process of claim 12 in which the aluminum trialkyl is aluminum triethyl.

14. A process for preparing alpha-olefins which consists essentially of reacting an allylic halide having the formula:

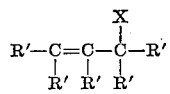

wherein each R' is individually selected from the group consisting of hydrogen and alkyl, cycloalkyl, aryl, alkaryl and aralkyl hydrocarbon radicals, and X is a halogen with an organometal compound having the formula AlR$_3$ wherein R is a hydrocarbon radical selected from the group consisting of alkyl, aryl, aralkyl, cycloalkyl and alkaryl, in the presence of a complexing agent which complexes with metal halide formed in the reaction and recovering a reaction product comprising alpha-olefin.

15. The process of claim 14 in which the allylic halide is allyl chloride.

16. The process of claim 15 in which the organometal compound is aluminum triethyl.

17. The process of claim 15 in which the organometal compound is aluminum trihexyl.

References Cited by the Examiner

FOREIGN PATENTS 838,996   6/1960   Great Britain.

OTHER REFERENCES

Lesbre et al.: "Compt. rend. 78$^e$ Congr. Soc. savantes Paris et depts., Sect. sci.," 1953, pages 423–8.

Murahashi et al.: "Bull., Chem. Soc. Japan, 1961, vol. 34, pages 631–5.

ALPHONSO D. SULLIVAN, *Primary Examiner.*

D. S. ABRAMS, *Assistant Examiner.*